United States Patent [19]

Bednarek et al.

[11] Patent Number: 5,621,793
[45] Date of Patent: Apr. 15, 1997

[54] TV SET TOP BOX USING GPS

[75] Inventors: Robert A. Bednarek; Philip A. Rubin, both of Washington, D.C.

[73] Assignee: Rubin, Bednarek & Associates, Inc., Washington, D.C.

[21] Appl. No.: 437,424

[22] Filed: May 5, 1995

[51] Int. Cl.⁶ .............................. H04N 7/167; H04L 9/00
[52] U.S. Cl. .................................. 380/20; 380/10; 380/21
[58] Field of Search ................................... 380/20, 10, 9, 380/21

[56] References Cited

U.S. PATENT DOCUMENTS

| | | |
|---|---|---|
| 3,789,131 | 1/1974 | Harney . |
| 3,826,863 | 7/1974 | Johnson . |
| 3,857,997 | 12/1974 | Toonder . |
| 3,882,266 | 5/1975 | Walding . |
| 3,882,289 | 5/1975 | Walding et al. . |
| 3,882,392 | 5/1975 | Harney . |
| 3,919,463 | 11/1975 | Walding . |
| 4,024,575 | 5/1977 | Harney et al. . |
| 4,054,860 | 10/1977 | Henderson et al. . |
| 4,112,464 | 9/1978 | Guif et al. . |
| 4,135,157 | 1/1979 | den Toonder . |
| 4,145,717 | 3/1979 | Guif et al. . |
| 4,215,366 | 7/1980 | Davidson . |
| 4,531,020 | 7/1985 | Wechselberger et al. . |
| 4,736,422 | 4/1988 | Mason . |
| 4,739,510 | 4/1988 | Jeffers et al. . |
| 4,802,215 | 1/1989 | Mason . |
| 4,807,256 | 2/1989 | Holmes et al. . |
| 4,993,067 | 2/1991 | Leopold ................................... 380/21 |
| 5,113,440 | 5/1992 | Harney et al. . |
| 5,144,663 | 9/1992 | Kudelski et al. . |
| 5,208,856 | 5/1993 | Leduc et al. . |
| 5,224,161 | 6/1993 | Daniel et al. . |
| 5,243,652 | 9/1993 | Teare et al. . |
| 5,282,249 | 1/1994 | Cohen et al. . |
| 5,295,188 | 3/1994 | Wilson et al. . |
| 5,345,504 | 9/1994 | West, Jr. . |
| 5,347,581 | 9/1994 | Naccache et al. . |
| 5,359,332 | 10/1994 | Allison et al. . |
| 5,373,557 | 12/1994 | Diehl et al. . |
| 5,379,045 | 1/1995 | Gilbert et al. . |

*Primary Examiner*—Stephen C. Buczinski
*Attorney, Agent, or Firm*—William L. Feeney; Kerkam, Stowell, Kondracki & Clarke, P.C.

[57] ABSTRACT

An integrated receiver decoder (IRD), commonly called a set-top box, has a global positioning system (GPS) receiver. The GPS receiver checks to see if the IRD is at an authorized location and allows descrambling of video signals only if the location is authorized. A central access control system, remote from the customers/viewers, has a high quality GPS receiver and sends some GPS data in the transmission medium used to send video signals to the customers. This GPS data, referred to herein as indirect GPS data, is used by the IRD such that it requires less complexity than otherwise. The IRD introduces a pseudo-random time delay in generating certain signals such that spoofing (i.e., providing phony signals to the IRD) is much more difficult. Various components of the IRD are in a common sealed container such as an integrated circuit or a smart card such that tampering with the components and spoofing are more difficult.

39 Claims, 6 Drawing Sheets

FIG. 6

TV SET TOP BOX USING GPS

BACKGROUND OF THE INVENTION

The present invention relates to a video signal access control system, often referred to as a tv or television set-stop box. More specifically, it relates to such a system where access to video signals from a remote source is allowed only if the system is in an authorized location.

Set-top integrated receiver decoder (IRD) boxes are now being used to allow persons to directly receive subscription and pay video transmissions from satellites using small outdoor antennas. Decoder boxes may also be used for encoded or scrambled over the air video signals (i.e., broadcast from ground transmitter to customer/viewer without passing through satellite therebetween) or for cable (i.e., wire or optical fiber) video signals.

The satellite transmissions may be digitally compressed in order to accommodate many programs on a single carrier and multiple carriers on a single satellite. Many of the programs are authorized for distribution and reception only in certain geographic regions, particularly certain countries, where program rights have been obtained for their transmission and reception. Additionally, a set-top box may be authorized only for non-commercial personal use by consumers and not by hotels, theaters or other commercial activities. It is therefore useful for the operators of a video distribution system (whether satellite, over the air, or cable) that their set-top boxes are operable only at authorized locations and that the boxes inhibit authorization of program descrambling of the boxes at unauthorized locations.

Various patents have issued on IRDs. Although customer access controls such as decoders are usually separate from the television receiver (hence the common name set-top box), it should be understood that they could also be integral (in a common housing) with a television receiver, monitor, or video cassette recorder.

The following U.S. Patents, hereby incorporated by reference, only a few of which will be discussed below, are noted relative to access control for video signals or communications signals:

| Inventor | U.S. Pat. No. | Issue Date |
| --- | --- | --- |
| Teare et al. | 5,243,652 | Sept. 07, 1993 |
| Daniel et al. | 5,224,161 | June 29, 1993 |
| Cohen et al. | 5,282,249 | Jan. 25, 1994 |
| West, Jr. | 5,345,504 | Sept. 06, 1994 |
| Mason | 4,736,422 | April 05, 1988 |
| Jeffers et al. | 4,739,510 | April 19, 1988 |
| Mason | 4,802,215 | Jan. 31, 1989 |
| Kudelski et al. | 5,144,663 | Sept. 01, 1992 |
| Leduc et al. | 5,208,856 | May 04, 1993 |
| Wilson et al. | 5,295,188 | Mar. 15, 1994 |
| Naccache et al. | 5,347,581 | Sept. 13, 1994 |
| Diehl et al. | 5,373,557 | Dec. 13, 1994 |

The Teare patent shows use of a global position system (GPS) receiver to authorize release of an encryption key only when a location versus time track corresponds to a proper use. If the key is released, it allows the remote unit to view a scrambled video tape, which tape is at the remote unit. The remote unit is in an airplane which is allowed to show the video tape when it is in a given location or country and its position changes are consistent with the anticipated flight path.

Daniel shows video descrambling using a smart card and a pseudo-random generator.

Cohen discloses video descramble using a smart card.

West shows cable television access regulated by a jamming signal.

In other developments, the NAVSTAR GPS achieved full initial operating capability in 1993 and provides precisely timed radio frequency signals from twenty-four orbiting satellites. A GPS receiver utilizes the transmission delay time from multiple orbiting satellites to make a determination of the position of the GPS receiver. The receiver must have a clock with good short term accuracy to lock onto and track a code message sent by a GPS satellite and further to make accurate pseudo-range measurements. A time-offset error between the highly accurate atomic standard clock in each satellite and a receiver can be removed by operating on the signal codes sent from four satellites rather than just three. The extra satellite signal permits a mathematical solution for the time offset as well as the ranges between satellites and receiver.

Some GPS receivers presently cost only a few hundred dollars, making them satisfactory for ships, aircraft and other vehicles where position determination is desired. The GPS receiver includes a microprocessor to perform calculations on measured data, special circuitry to calculate correlations, and requires a visual display, packaging, power supply, etc. Some of these items are already in the set-top box for other purposes and other functions can be simplified by performing a portion of the processing at the up-link site and transmitting the results along with commands over the same communication system providing the video, audio and data programming to the IRD's. The complexity of the IRD processing to accommodate the physical position validation can then be reduced to a level where the cost of electronic circuitry to implement these functions is acceptably small.

In the normal operation of a GPS receiver time-of-arrival measurements of code-division multiplexed radio signals from multiple GPS satellites are made by the receiver. These measurements are then converted to pseudo-range measurements using the radio wave propagation velocity. The range measurements are called pseudo-range because of a time bias error introduced by imperfect receiver time synchronization with the satellites' precise timing controlled by atomic clocks. The time bias is treated as an additional variable in the position calculations and one additional pseudo-range measurement is made to provide an additional equation to solve for this additional variable. Although the calculations to be performed are straight forward, a position solution must be iteratively calculated to converge on a solution. Additionally, corrections must be calculated for propagation effects in order to produce accurate position determination as normally required for airplanes, ships, boats, or other vehicles.

The following U.S. Patents, hereby incorporated by reference, show various GPS receivers and/or methods:

| Inventor | U.S. Pat. No. | Issue Date |
| --- | --- | --- |
| Holmes et al. | 4,807,256 375/97 342/357 | Feb. 21, 1989 |
| Allison et al. | 5,359,332 342/357 | Oct. 25, 1994 |
| Gilbert et al. | 5,379,045 | Jan. 03, 1995 |

OBJECTS AND SUMMARY OF THE INVENTION

Accordingly, it is a primary object of the present invention to provide a new and improved video signal access control system.

A more specific object of the present invention is to provide a video signal access control which authorizes access to the signal only if the location of a customer access control is at the authorized customer's place (hereafter called customer access control using position).

A further object of the present invention is to provide customer access control using position wherein a GPS receiver is utilized.

Yet another object of the present invention is to provide simple, low cost customer access control using position wherein a simple GPS receiver or a single channel GPS receiver is utilized, such a receiver being suitable for authorization at a single fixed location.

A further object of the present invention is to provide video signal access control using a central access control at a source of the video signals and remote from the customers.

Yet another object of the present invention is to provide a video signal access control system having central access control using a GPS receiver and wherein the central access control supplies position information to the transmission medium for transmission to customers. A further object of the present invention is to provide a video signal access control system using multiple criteria for authorization including location and other factors such as payment for service, no black out (i.e., blocking of signal) resulting from parental restrictions on programming available to children, and no black out resulting from regional restrictions (e.g., sports event may be shown in areas only outside of the city, area, or state in which the event takes place).

Yet another object of the present invention is to provide a video signal access control system wherein a customer access control at a customer's place does not need the ability to transmit information to a central access control and does not need a central access control which sends a descramble key or otherwise responds to communications from the customer access control.

A still further object of the present invention is to provide a video signal access control system having a customer access control at a customer's place, wherein the customer access control is highly resistant to attempts to defeat access control.

It is desirable to have each and every set-top box perform signal descrambling only if it is physically located where it has been authorized. A system is herein described which uses the existing NAVSTAR Global Positioning System (GPS) to aid in validating the location of each set-top box and authorizing it to descramble program services ordered by the consumer, along with other criteria including payment for services, only if it is physically located where it was authorized. As used herein, GPS shall mean a system using a plurality of radio transmitters at different locations and a receiver which uses transmissions from the transmitters to determine or validate the location of the receiver. Of special concern is the ability of a position determining device within the set-top box to not be defeated by someone wishing to use the box at an unintended location. The system herein is resistant to insertion of false data which would cause the position to be determined as the one authorized while existing at an unauthorized position. Finally, it is required that the position determining device be a inexpensive as possible.

In some applications of GPS in the IRD it is desirable that the IRD determine its own position after it is initially installed rather than having its authorized position communicated to it by the programming channel. This minimizes the system work in translating a customer's postal address into GPS coordinates. In this case the IRD makes four pseudo-range measurements using four different GPS satellites to acquire the timing data to use in the four range equations for position determination. This position is then stored within the IRD as the authorized position for later comparison with measurements which will indicate whether or not the IRD has been moved to another location or not. After the IRD is initialized with an authorized position, the subsequent action of verifying the IRD position has not changed can be performed in either of two ways. First, subsequent positions can be determined and compared with the authorized position. Second, ranges generated to GPS transmitters (at satellites) individually can be compared to the range calculated from the known GPS position and the authorized position. Each matching range then verifies consistency between the authorized position and the present IRD position. It is usually not critical that the initial position determination be made in a hurry. This allows for the ranging measurements to be made sequentially in a single channel receiver, thus minimizing receiver hardware expense at the customer location.

The above and other features of the present invention which will be more readily understood when the following detailed description is considered in conjunction with the accompanying drawings are realized by a video signal access control system including a customer access control having: a signal input (i.e., may be a receiver or other input device) to receive at least one video signal from a remote source; a video signal processor operably connected (i.e., directly or indirectly) to receive (i.e., directly or indirectly) video signals from the signal input; a conditional accesser operably connected to the video signal processor; a signal output operably connected to the video signal processor and providing a useable video output signal only upon the conditional accesser authorizing access to one or more video signals from the remote source; and a GPS signal receiver operable to receive position information from remote sources and operably connected to the conditional accesser, the conditional accesser authorizing access only if the GPS signal receiver receives signals consistent with the customer access control being at an authorized location. As used herein, at an authorized location will include some tolerance such that a customer access control or IRD moved from one room in a house to another room will be at considered at the authorized location in either room.

Preferably, the conditional accesser authorizes access only if the GPS signal receiver receives signals consistent with the customer access control being at a single fixed location authorized for service. (As used herein, at a single fixed location includes a range of tolerance such that movement from one room of a house to another room will not be considered movement from the single fixed location, but a customer access control which continues allowing access as the customer access control is moved as part of ongoing transportation will not be considered as restricting access to a single fixed location.) The conditional accesser authorizes access using criteria to test for authorization in addition to information about the location of the customer access control. The customer access control is a non-transmitting unit.

A first embodiment has a customer access control which uses the GPS receiver and conditional accesser to make range verifications consistent with the customer access control being at a single fixed location authorized for service and without the customer access control determining the location of the customer access control. This embodiment may use a single channel GPS receiver. A second embodiment has a customer access control which uses the GPS receiver to determine the location of the customer access control and wherein the conditional accesser authorizes access only if the determined location is at the single fixed location authorized for service.

The customer access control further includes a GPS processor operably connected to receive direct GPS information from the GPS receiver and a decoder operably connected to the signal input to provide indirect GPS signals received from a transmission medium carrying the at least one video signal from a remote source. The GPS processor uses information from the indirect GPS signals to determine which GPS sources are to be used by the customer access control and the location of the determined GPS sources.

The video signal access control system further includes a central access control remote from customers and having: a source of at least one video signal; an output device for placing video signals from the source onto a transmission medium for transmission to customers with the customer access control; and a central GPS receiver operable to receive position information from remote sources and operably connected to apply data messages to the output device, the data messages corresponding to the position information and the output device supplying the position information to the transmission medium for transmission to customers. The video signals sent to customers are unusable without a key. The conditional accesser requests measurements from the GPS processor at measurement start times which are at least pseudo-random (i.e., random or pseudo-random).

The customer access control or customer accesser has the GPS processor and conditional accesser within a common sealed container which is either an integrated circuit or a smart card. The common sealed container has within it a code generator operable to generate a code for selecting a GPS source from which data is to be obtained.

The present invention may alternately be described as a video signal access control system including a customer access control having: a signal input to receive at least one video signal; a video signal processor operably connected to receive video signals from the signal input; a conditional accesser operably connected to the video signal processor; a signal output operably connected to the video signal processor and providing a useable video output signal only upon the conditional accesser authorizing access to one or more video signals from the remote source; and a GPS signal receiver operable to receive position information from remote sources and operable connected to the conditional accesser, the conditional accesser authorizing access only if the GPS signal receiver receives signals indicating that the customer access control is at an authorized location; and wherein the conditional accesser authorizes access only if the GPS signal receiver receives signals consistent with the customer access control being at a single fixed location authorized for service.

The present invention may alternately be described as video signal access control system including a customer access control having: a signal input to receive at least one video signal; a video signal processor operably connected to receive video signals from the signal input; a conditional accesser operably connected to the video signal processor; a signal output operably connected to the video signal processor and providing a useable video output signal only upon the conditional accesser authorizing access to one or more video signals from the remote source; and a GPS signal receiver operable to receive position information from remote sources and operable connected to the conditional accesser, the conditional accesser authorizing access only if the GPS signal receiver receives signals indicating that the customer access control is at an authorized location; and wherein the conditional accesser authorizes access uses criteria to test for authorization in addition to information about the location of the customer access control.

The present invention may alternately be described as a video signal access control system including a customer access control having: a signal input to receive at least one video signal; a video signal processor operably connected to receive video signals from the signal input; a conditional accesser operably connected to the video signal processor; a signal output operably connected to the video signal processor and providing a useable video output signal only upon the conditional accesser authorizing access to one or more video signals from the remote source; and a GPS signal receiver operable to receive position information from remote sources and operable connected to the conditional accesser, the conditional accesser authorizing access only if the GPS signal receiver receives signals indicating that the customer access control is at an authorized location; and wherein the customer access control is a non-transmitting unit.

The present invention may alternately be described as a video signal access control system including a central access control remote from customers and having: a source of at least one video signal; an output device for placing video signals from the source onto a transmission medium for transmission to customers; a central GPS receiver operable to receive position information from remote sources and operably connected to apply data messages to the output device, the data messages corresponding to the position information and the output device supplying the position information to the transmission medium for transmission to customers. The central access control further includes a central conditional access operably connected to the GPS receiver/processor and the output device to provide a scrambling key to the output device for scrambling video signals prior to placement on the transmission medium. The central conditional access encrypts the position information supplied to the output device. The video signal access control system further includes a customer access control having: a signal input to receive at least one video signal from a remote source; a video signal processor operably connected to receive video signals from the signal input; a conditional accesser operably connected to the video signal processor; a signal output operably connected to the video signal processor and providing a useable video output signal only upon the conditional accesser authorizing access to one or more video signals from the remote source; and a GPS signal receiver operable to receive position information from remote sources and operably connected to the conditional accesser, the conditional accesser authorizing access only if the GPS signal receiver receives signals consistent with the customer access control being at an authorized location.

BRIEF DESCRIPTION OF THE DRAWINGS

The above and other features of the present invention will be more readily understood when the following detailed description is considered in conjunction with the accompanying drawings wherein like characters represent like parts throughout the several views and in which.

DETAILED DESCRIPTION

Figure 1:
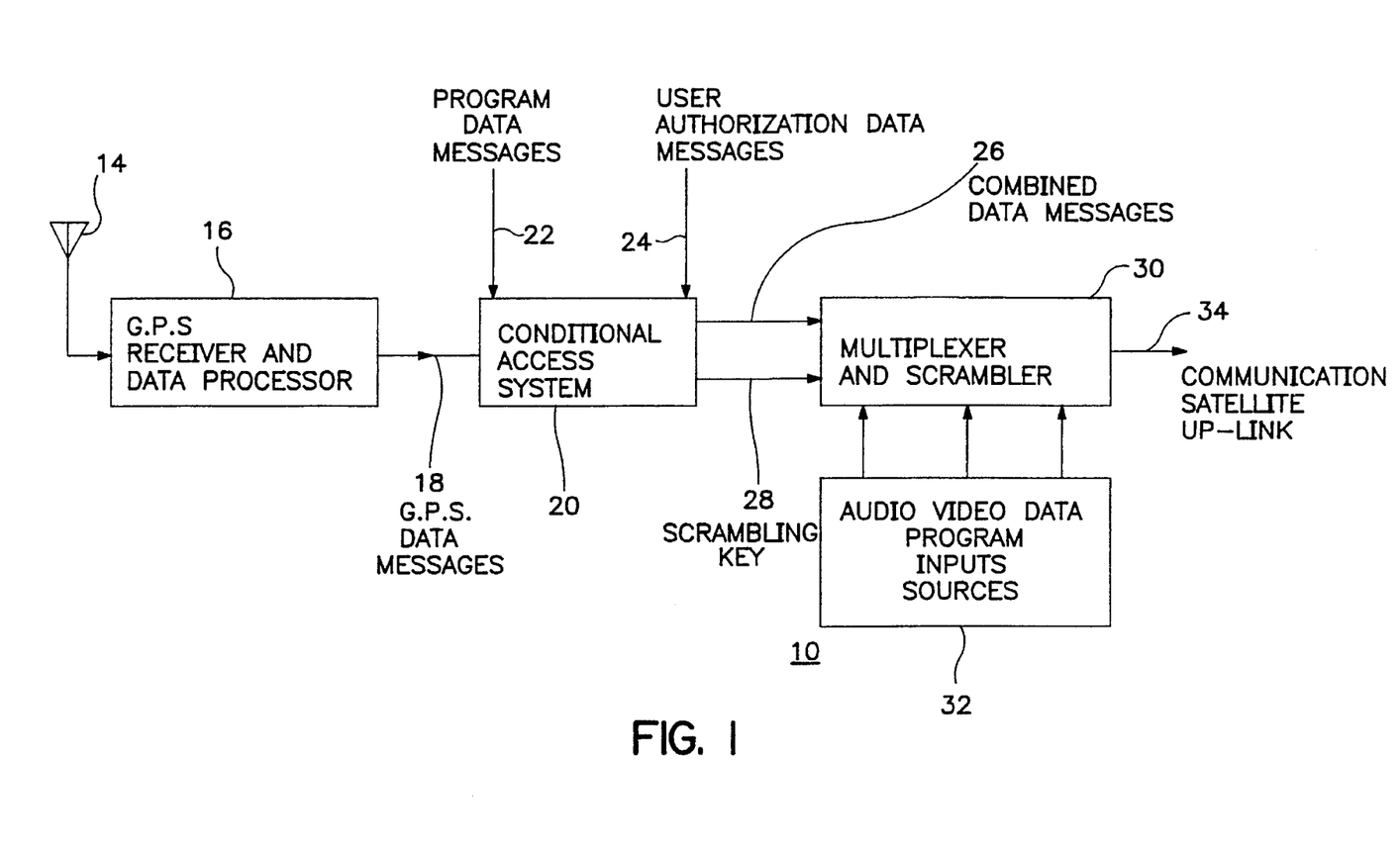
FIG. 1 is a simplified block diagram of a central access control used with a video signal access control system according to the present invention.
Figure 2:
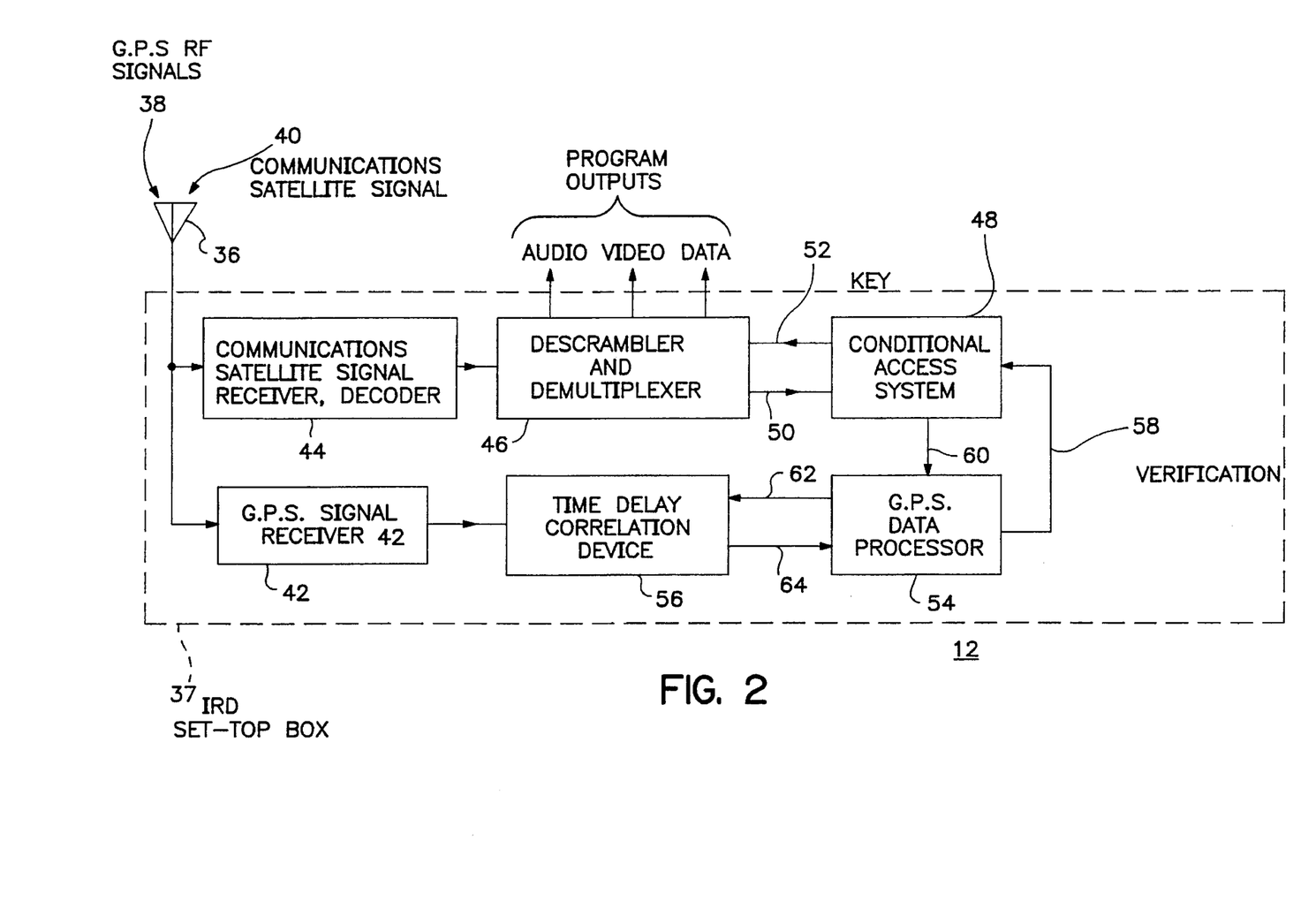
FIG. 2 is a simplified block diagram of a customer access control used with the video signal access control system.

With reference to FIGS. 1 and 2, a video signal access control system includes a central access control or system 10 of FIG. 1 and a customer access control or system 12 of FIG. 2.

The central access control 10 is remote from customers who subscribe to the various programs. An antenna 14 receives global positioning system (GPS) information from GPS satellites (not shown) and is connected to a central (i.e., remote from the customers/subscribers) GPS receiver/data processor 16, which may operate in known fashion to provide GPS data messages 18 to a central conditional access system or control 20. Specifically, GPS receiver/processor 16 is preferably a code division multiplex multiple channel receiver. The received signals are all at the same radio frequency, but each GPS satellite's signals has a different repeating code which differentiates it from the other signals.

GPS receiver/processor 16 is a high quality standard unit, but it determines which GPS satellites are best to use for position fixing at the sites where the customer access control systems 12 are. That is, a normal GPS receiver determines which satellites it should be using for position determination. GPS receiver/processor 16 will instead determine which satellites should be used at customers' sites. If the geographic coverage area of the various customers' sites is sufficiently large, GPS receiver/processor 16 will provide multiple determinations for different regions. For example given geographic regions A and B, the best satellites for receiving GPS data in region A may be different at a given time from the best satellites for receiving GPS data in region B. Accordingly, GPS receiver/processor 16 may, using a known central or median geographic location in region A, readily determine the best satellites for receiving GPS data in region A. Likewise, GPS receiver/processor 16 may, using a known central or median geographic location in region B, readily determine the best satellites for receiving GPS data in region B. Given knowledge of the location of such central or median geographic location of a given region, known techniques readily allow determination of the best satellites to use at a given location.

The transmitters of the GPS satellites send 50 bit-per-second data superimposed on their output signals which are so called Gold codes (named after an individual) corresponding to a particular satellite. As known, these Gold or GPS codes are usually one mega-chip per second codes. The data is decoded to using known techniques to determine the precise position and velocity (vector) information, collectively called ephemeris data, of each satellite which will be used for verifying or determining location of the customer access control system 12 in a manner discussed in detail below. (As readily known, the velocity vector is the time rate of change of the position vector.) The correction data for the expected velocity of propagation is also decoded in known fashion.

GPS data messages 18 (i.e., signals on electrical connection lines 18), including the position, velocity, and correction data relative to the various satellites, are supplied by receiver/processor 16 to a central conditional access system 20, which may also be called a central conditional accesser. Depending on the bandwidth at the output of system 10 and other considerations, the GPS data messages 18 may simultaneously include data on all satellites used for all regions or time multiplex data from one satellite and/or groups of satellites (e.g., all satellite data from satellites used for region A for a short interval followed by all satellite data from satellites used for region B for a short interval). In the example with regions A and B, the data from satellites to be used for region A can be addressed to the various customer access control systems 12 (FIG. 2 only) within region A, whereas the data from satellites to be used for region B can be addressed to the various customer access control systems 12 within region B.

System 20 also receives program data messages 22 and user authorization data messages 24 supplied by sources (not shown) in a known fashion. Central conditional access system 20 supplies combined data messages 26 (the various inputs to system 20 output in encrypted form) and a scrambling key 28 to multiplexor/scrambler/transmitter 30, which may be called an output unit. The output unit 30 receives audio, video, and data signals from program sources 32 and which supplies outputs 34 to a transmission medium. In known fashion, the outputs 34 include scrambled versions of the various audio, video, and data program signals. The outputs 34 also incorporate the data input to system 20, this being placed on the transmission medium in an unscrambled, but encrypted form. The combined data messages 26 and outputs 34 would incorporate the various GPS data as discussed and using known techniques.

Although the outputs 34 are shown as being provided to an up-link for a communication satellite, the outputs could be applied to any transmission medium for transmission (directly or indirectly) to customers. For example, the central access control system 10 may alternately supply the outputs 34 over the air (non-satellite televisions broadcast) and/or by cable (wires or optical fiber). In any case, the signals will be scrambled and descrambling will only take place if one of the customer access control systems 12 of FIG. is at an authorized location as discussed below.

The multiplexer/scrambler/transmitter 30 may be, for example, a standardized MPEG2 system multiplexer which operates on a packet basis, receiving audio, video, and data packets and combining them into a formatted serial data stream to issue to the communication satellite up-link. As well known, MPEG2 is a particular digital video compression system or technique which accommodates multiple video, audio, and data signals to be combined and transmitted on a single radio frequency carrier.

By having the important features related to the high quality, multiple channel GPS receiver/processor 16 at the system 10, the system 12 discussed below can be simpler than otherwise. Specifically, the advantageous feature of retransmitting the discussed GPS data, while not a necessary part of the present invention in its broadest respects, allows for a much simpler and less expensive system 12. Since a customer access control system 12 must be at each customer/subscriber location, it is useful to hold down costs and complexity of the customer access control system 12, whereas making the central access control system 10 more complex does not involve great expense since there would only be one or a relatively low number. Since the conditional access system 20 operates in known fashion (except for receiving and incorporating in its output the GPS data messages 18), details of the system 20 including components of known conditional access systems which ordinarily cause the scrambling keys to be changed and to be decodable by authorized IRDs (such as the customer access control system 12) need not be shown or presented.

As an alternative to the transmission of the described GPS data, system 10 may alternately send only the identity of the satellites to be used by the customer access control 12, instead of including the position and velocity information. However, that would require more complex operations by the customer access control 12.

Turning now to the customer access control system 12 of FIG. 2, an antenna 36 receives both direct (i.e., not relayed from a central system such as 10 of FIG. 1) GPS signals 38 from a satellite and communications satellite signals 40 which include the indirect (i.e., relayed through central system 10) GPS signals and correspond to signals 34 of FIG. 1 following their up-link to one or more communications satellites and down-link to the customer access control system 12. In theory, the same satellite (not shown) could provide both some direct GPS signals and the communications signals 40, but satellites usually do not combine GPS and communications functions. The antenna 36 may be a small satellite dish type antenna. Although not shown, separate antennas for direct GPS signals and for communications signals could be used instead of the single reception antenna 36.

The signals received by antenna 36 are sent to an integrated receiver decoder (IRD) 37 and are filtered (filter not shown) using known techniques such that the direct GPS signals 38 go to GPS signal receiver 42 and the communications signals 40 go to the communications satellite receiver/decoder 44 (which serves as a signal input device). The output of receiver/decoder 44 is a demodulated and decoded baseband signal corresponding to the signals 34 of FIG. 1 and this output is supplied to descrambler/demultiplexer 46. The descrambler/demultiplexer 46 operates in known fashion to de-multiplex and direct signal packets for a customer conditional access system 48 along a connection 50 to the customer conditional access system 48. Packets corresponding to program audio, video, and data are descrambled by component 46 if a descramble key is supplied at connection 52 by the system 48. The system 48 provides the correct descramble key only if all the criteria for authorization are satisfied. Known IRDs allow access upon satisfaction of criteria based on the program data messages 22 and user authorization data messages 24 of FIG. 1. Common or standard operational details of known components 44, 46, and 48 need not be discussed, but having GPS data as one of the criteria for release of the descramble key and other aspects in which components 44, 46, and 48 differ from the usual prior systems will be emphasized hereafter.

The system 12 will not have the conditional access system 48 release the correct key on 52 unless (in addition to criteria based on other factors such as payment for service, no black out resulting from parental restrictions on programming available to children, and no black out resulting from regional restrictions) the IRD 37 is at its authorized geographic position. Whether it is in proper geographic position is determined by a GPS data processor 54 connected to GPS signal receiver 42 by way of a time delay correlation device 56. Processor 54 performs calculations of pseudo-range and time bias as discussed hereafter and will provide a position authorized binary signal on line 92 only if the geographic position of IRD 37 is consistent with the expected or previously authorized location.

The GPS processor 54 works in conjunction with the time delay auto-correlation device 56. Device 56 uses a known comparison technique involving a locally generated code for the satellite which is to be used. (The satellites to be used are supplied by the indirect GPS data and passed on line 60 to processor 54.) The locally generated code is supplied on line 62 to device 56 for shifting in time until it matches in time the same code transmitted from the GPS satellite. The value of time shift is then passed back to the processor 54 on line 64 for pseudo-range calculations using the ranging equation:

$$(X_s-X_i)^2+(Y_s-Y_i)^2+(Z_s-Z_i)^2=(R-R_b)^2$$

where $X_s$, $Y_s$ and $Z_s$ represent satellite position coordinates and $X_i$, $Y_i$, and $Z_i$ represent position coordinates of the IRD 37. The range between the satellite and the IRD 37 at a particular time is represented by R, whereas $R_b$ is the range bias due to the IRD clock (not separately shown) instability.

Since the indirect GPS data preferably supplied to IRD 37 includes satellite position coordinates at a given time and the three velocity components at that time, $X_s$, $Y_s$ and $Z_s$ may be readily determined by processor 54 at a later (relatively short time delay) time. Alternately, if a more complex IRD is used, the direct GPS data can generate these values independent of any indirect GPS data other than the identity of the satellites to be used.

Evaluating the ranging equation for two different satellites (doing the equation twice) allows one to check for consistency with an authorized location. As used herein, such a consistency check shall be referred to as position validation. Considering that $X_i$, $Y_i$, and $Z_i$ representing position coordinates of the IRD 37 may be taken as at the authorized location meaning that the proper range R will be known, a first application of the equation yields a value for $R_b$, the range bias due to offset of the IRD clock from the satellite clock. A second application of the equation is then performed by processor 54 using a different satellite to check if the right and left sides of the equation are equal. If the right and left sides of the equation are equal, the range is proper and the position is highly likely to be valid since an equal range is unlikely. (Even if a range is equal to the proper range at a given moment, movement of the IRD satellites means that shortly thereafter, the range will be invalid unless the IRD is at an authorized position.) If the right and left sides of the equation are not equal, processor 54 will not supply the verification on line 58 such that conditional access 48 does not provide the descramble key on line 52 and usable program output(s) are not supplied by component 46.

Instead of simply validating the IRD position as described above, an alternative has the IRD 37 operate in a position determination mode. In this mode, the equation above is calculated four times to solve for four unknowns: range bias $R_b$ and $X_i$, $Y_i$, and $Z_i$ representing position coordinates of the IRD 37. A Taylor series or other known iterative technique can be used to solve for the four unknowns. The determined IRD position coordinates may then be compared to previously stored authorized IRD coordinates. If they are equal (or within a given tolerance range), the verification will be supplied on line 52. If they are not equal (or not within a given tolerance range), the verification is not supplied such that conditional access 48 does not provide the descramble key on line 52 and usable program output(s) are not supplied by component 46.

The advantage of using the position validation technique is that it may be simpler (with associated lower costs and less processing power needed) than having position determination in the IRD. An advantage of IRD position determination is that it may be used for self-initialization at the customers site. That is, the authorized location can be initialized where the customer first sets up the IRD. This will avoid the need for the company providing the IRD to determine and initialize the IRD values for proper location. This prevents descrambling at other locations, but the company may still need to check somehow to insure that the customer did not initially take the IRD to an unauthorized location. On the other hand, this technique of self-initialization of the position may be quite useful if an employee of the company delivers the IRD to the customer.

Figure 3:
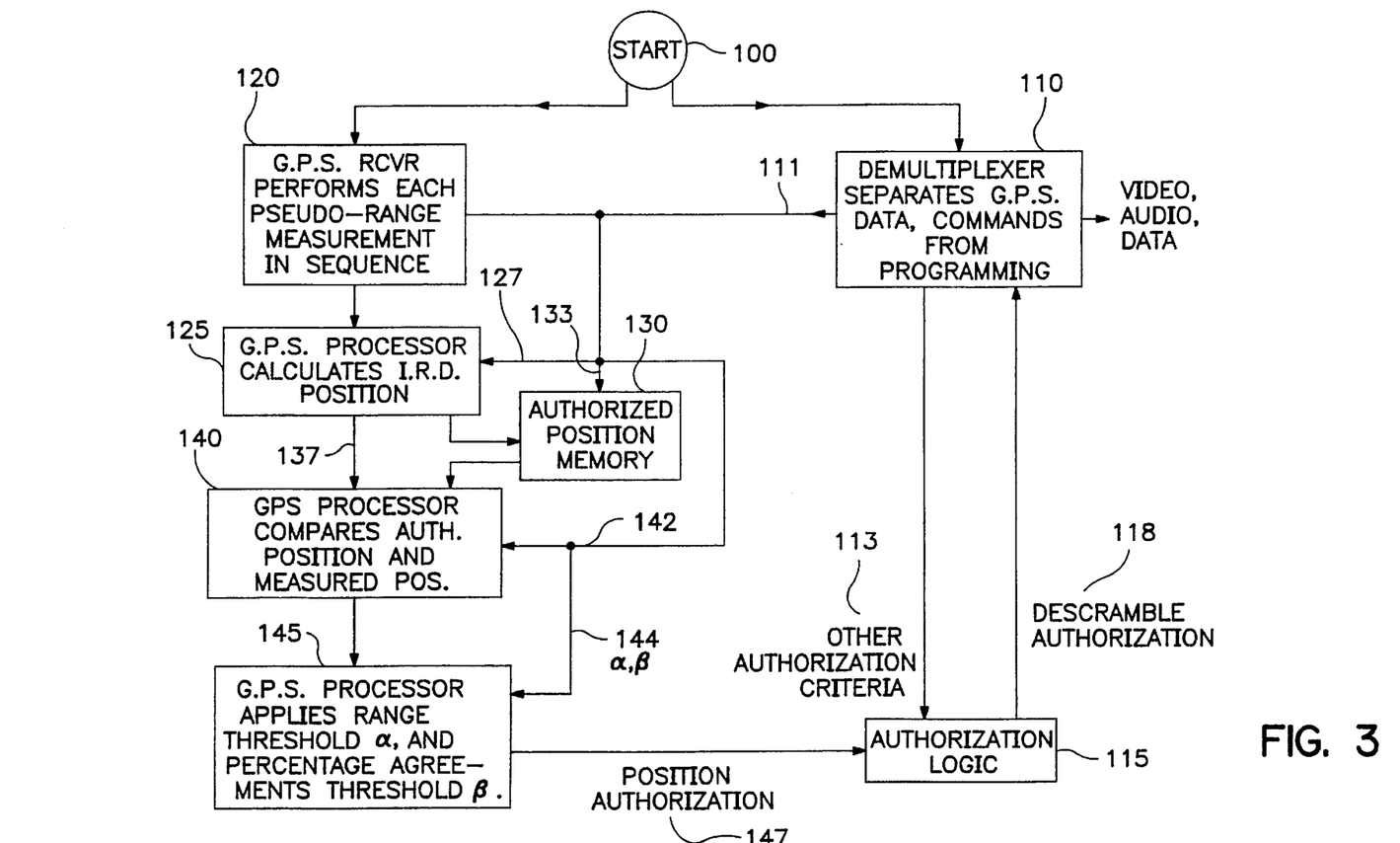
FIG. 3 is a flow chart of a first embodiment customer access control which calculates its position.
Figure 4:
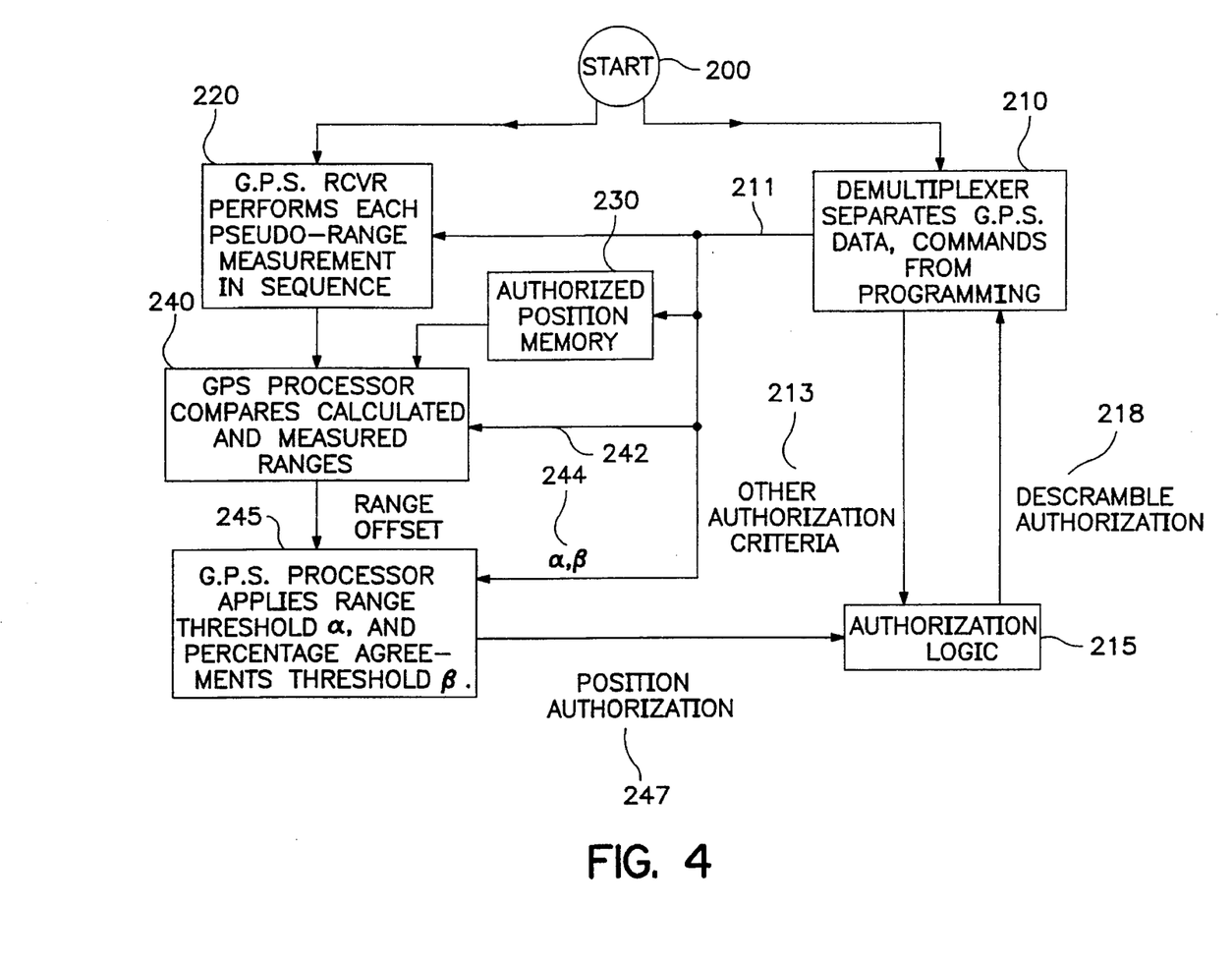
FIG. 4 is a flow chart of a second embodiment customer access control which validates its position.

Still further details are shown in FIG. 3 of a first embodiment. The processing shown herein is limited to the operation of the GPS and its interface with the MPEG2 or other programming delivery system. Included in this embodiment is the GPS processing of four pseudo-range measurements to explicitly determine the IRD position. FIG. 4 differs from FIG. 3 in that the GPS processing in the IRD in FIG. 4 performs only a range validation (which, over time, is position validation) after the programming delivery system has supplied the IRD with the GPS coordinates of the authorized location.

In FIG. 3 start block 100 leads to block 110 where the demultiplexor provides that portion of the programming signal which is directed to GPS commands and data at line 111 supplied to block 120. At block 120, the GPS receiver receives the command from the lines 111 (this could be by way of the conditional access system of FIG. 2) to perform a pseudo-range measurement and identify the particular GPS satellite. At 120, the receiver performs the correlations required to obtain the pseudo-range and passes the pseudo-range to the GPS processor at block 125. The GPS coordinates of the GPS satellite used for the measurement are delivered from demultiplexor block 110 at input 127 of block 125. Delivery via the programming channel aids the system in that the GPS receiver 42 of FIG. 2 need not necessarily demodulate this data from the GPS signal directly and is therefore able to quickly move on to the next GPS satellite signal to be processed. It also avoids a need for the GPS receiver requiring more than a single GPS signal to be processed at a time, thus saving on the amount of hardware required.

At the time of IRD initialization a first position determination is stored in an authorized position memory as indicated at block 130 via data path 135. Subsequent position determinations will compare new position determinations with the position stored in memory. This comparison is performed in block 140 wherein the present measured position is received from the GPS processor 54 of FIG. 2. The authorized position is normally received via path 138. However, the system allows a position check to be made with a position communicated via the programming channel via path 142. The system operator has the choice of validating the position with reference to a position he sends to the IRD if he desires. This system of FIG. 3 is capable of making an initial position determination by itself so that it need not be provided over the programming channel. The ability to later validate this initial position provides insurance that the initial position measurement was made at the authorized location and not at some unauthorized location.

The output of block 140 is the range error between the currently measured position and the authorized position and is delivered to block 145. Block 145 performs processing which first determines if the range error is less than a prescribed threshold value, alpha. The value of alpha, and also the later used threshold, beta, is provided from the programming channel via path 144. A binary result from this operation occurs such that a "one" is produced for a range error equal to or less than alpha and a binary zero is produced for a range error which exceeds alpha.

So that any single range error produced by the GPS measurement process will not disable the IRD from descrambling the program material a second threshold value called beta is used. This process requires that a predetermined percentage of the range errors are within the threshold alpha. Said pre-determined percentage is governed by the threshold value of beta.

The output of processing block 145 is the binary position authorization signal at 147. The signal at 147 is one input component to the authorization logic block 115. Other authorization criteria are delivered to 115 via path 113. The logic in block 115 essentially requires that signal 147 authorize descrambling, along with the other criteria of 113 for the descramble authorization 118 to be asserted and allow the programming to be viewed.

The logic block 113 is more complex than a simple AND gate in that the programming channel can cause the descramble authorization to be enabled or disabled regardless of the state of position authorization signal 147. This gives the system flexibility to not require position verification in some instances.

A further capability of this system permits certain geographic areas to be excluded from providing a position authorization. In this case the demultiplexor 110 provides the excluded area in terms of GPS coordinates to processor 140 via path 142. Processor 140 then compares the excluded area with the position held in memory 130. If the position in memory 130 is within the excluded area sent via path 142, then block 140 sends the maximum range error possible to block 145 which responds by not authorizing the position at its output 147.

FIG. 4 shows a second embodiment of the invention wherein the IRD does not make any position determinations. In this embodiment only range verifications are performed utilizing pseudo-range measurements made at the IRD and an authorized position delivered to the IRD via the programming channel. An advantage of this embodiment is the saving in the hardware and software associated with the processing of pseudo-range measurements in an iterative fashion using four simultaneous non-linear equations. The GPS receiver operation 220 in FIG. 4 is the same as receiver operation 120 in FIG. 3. Also the same between FIGS. 3 and 4 are blocks 100 and 200, blocks 110 and 210, blocks 115 and 215, and blocks 145 and 245.

In particular in FIG. 4 block 230 involving the authorized position memory differs from that shown in FIG. 3 in that the authorized position can only be entered from the programming channel in FIG. 4, and that the processing in block 240 performs only range verifications. Processor 140 in FIG. 4 performs a range computation between the GPS satellite being measured and the IRD based upon the authorized position coordinates in memory 230 and the coordinates passed to it via path 242 from demultiplexor operation block 210. Alternatively, the GPS satellite position coordinates can be demodulated from the GPS data, but this requires that the single channel receiver, 220, remain synchronized with a single GPS satellite for a longer period of time. The result of the range calculation is then subtracted from the range determined from the measured data. This yields the range offset value directly which is the needed output to send block 245. The remaining processing in FIG. 4 corresponds to that already described in FIG. 3.

An important aspect of the invention is that the set-top box not be fooled into thinking it is at an authorized position when in reality it has been moved to an unauthorized position. The IRD may be in the hands of someone who wants to cause the GPS receiver to think it is receiving time delay measurements consistent with the authorized position but in reality is receiving artificial time delay measurements consistent with the authorized location but not its actual location. It must be assumed that the general design of the IRD will become known to those skilled in the art of electronic circuit design (following any commercial release of the IRD), particularly those with experience in set-top boxes and conditional access systems. If the set-top box is opened to expose the circuit components then electronic signals which travel between components such as integrated circuits can be readily observed with test measurement equipment. Further, it is possible to break certain connections and substitute other signals. With reference to FIG. 2, it can be seen that the authorization system shown could be readily defeated (absent a feature discussed below) by tampering with the verification signal 92. If the signal connection 92 to conditional access system 85 was broken and instead tied to the voltage level corresponding to correct position verification then the GPS system would be totally bypassed and its purpose defeated.

The set-top box system employing the GPS can be made resistant to tampering by placing all of the circuitry relating to the conditional access system and the GPS inside a sealed container. Such a container might be an integrated circuit or a smart card, for example. The container is designed such that an attempt to pen it for internal signal measurement purposes effectively destroys the container's internal circuitry. This implementation permits visibility of only encrypted data passing into the container and only the descrambling keys, which are rapidly changed, appearing at the output pins of the container. It is desirable to be able to renew the conditional access system should the security of the system be broken by one technique or another by the straight forward method of replacing only the smart card. However, it is relatively expensive to discard all of the GPS circuitry should it be co-located inside a replaced smart card. A method is next disclosed wherein certain of the GPS circuitry is located inside a sealed container such as a smart card and other parts of the GPS circuitry outside the sealed container. The circuitry parts outside the sealed container are not replaced when a smart card is changed.

Figure 5:
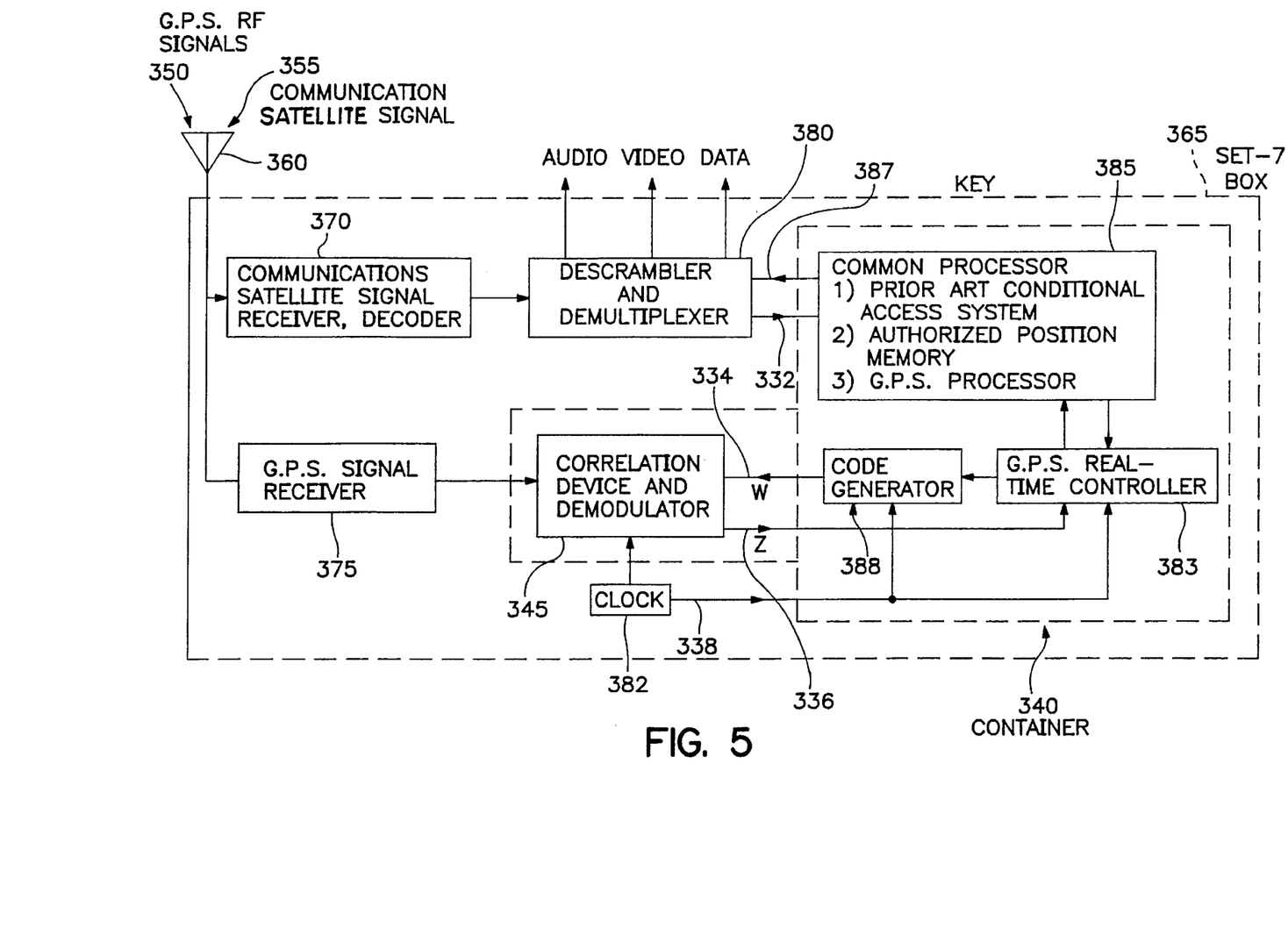
FIG. 5 is a block diagram of a customer access control having a tamper resistant feature which may use the techniques of either FIGS. 3 or 4.

FIG. 5 shows the method for using the GPS circuitry to resist defeat by tampering methods yet place certain portions of the GPS circuitry permanently in the set-top box which need not be replaced when a smart card is replaced. Several elements of FIG. 5 perform the same functions as in FIG. 2. Specifically, elements 350, 355, 360, 370, 375, 380 and 387 in FIG. 5 correspond to elements 38, 40, 36, 44, 42, 46, and 52 respectively in FIG. 2. Since the functions performed are the same, these elements will not be described a second time.

In FIG. 5 the dashed line, 340, shows the elements which are co-located inside of the sealed container. The signals which are visible passing into and out of the sealed container are as follows. First, the encrypted GPS and conditional access data 332 from the descrambler and demultiplexor 380 pass into container 340. Second, the stable clock 382, which resides in the set-top box or IRD, send signals to container 340 via path 338. This clock has sufficient short term stability to operate the GPS receiver processing system. Third, the key 387 for descrambling the video, audio and data programming exits the container. This key is the correct key only if all authorization criteria including the GPS position criteria have been met.

Next the baseband code W, 334, exits container 340 to operate correlation device and demodulator, 345. This is the one mega-chip per second GPS code corresponding to the code of one of the GPS satellites. It is a desirable countermeasure to place the circuitry which creates the code sequence corresponding to a particular GPS satellite inside the container. This has the effect of requiring the attacker of the system to determine which satellite is being interrogated by correlating the bit stream with several bit streams of GPS satellites which are visible. An additional problem for the attacker is to also measure the particular time delay of the code being used. These two processes require measurement equipment and measurement time. If the code generator 388 were outside of the container 340, it should be presumed that the attacker could readily determine the particular code and code time delay being used by the IRD. The attacker would be aided by observation of the code generator 388 state machine either directly or the loading word which is used to load a starting state into said generator. Since the GPS code generator uses the well known Gold codes to generate the matching satellite codes a knowledge of the state of the state machine provides the attacker the information as to the particular code being used. It is therefore desirable to hide the code generator 388 inside container 340.

It is beneficial from a security standpoint to also place the correlation device 345 in the container 340 in FIG. 5, this being illustrated by the dashed lines there around. This then precludes visibility of the code W, 334, and the output correlation result Z, 336, by the attacker. This provides a very high level of security relative to spoofing the GPS system. This embodiment of the invention can be used in a systems especially where container 340 is seldom removed from set-top box 365.

In a more cost sensitive embodiment and/or where container 340 can be expected to be renewed more often, the correlation device and demodulator 345 can be placed outside of the container 340. This permits the radio frequency (RF) processing in 345 to be performed outside the container 340, and removes the need for the RF signal from GPS signal receiver 375 to be passed through a connector pin of container 340. Further, it allows the local RF oscillator which is modulated by the code W, 334, and which hetrodynes the RF signal down to a frequency which can be demodulated by a Costas, or equivalent, phase locking loop and signal demodulator to be placed outside said container. To minimize the expense of the renewable portion of the IRD, the circuitry of block 345 would be placed in the IRD box 365 outside of said container.

Two methods of the invention to greatly reduce the visibility as to the GPS satellite being correlated with a locally generated code are next disclosed. The first method randomly changes the waveform W, 334 in FIG. 5, between the GPS satellites. In this way, the satellites are not addressed in any particular order which increases the difficulty of someone trying to spoof the system. Satellites which are not visible also are included so as to cause the attacker even more additional effort and confusion in trying to sort out what the IRD system is doing. It is practical to add such diverting tactics since the actual position does not need to be repeatedly validated with any great haste.

The second method involves the random order of testing specific time delays of a GPS code to a particular GPS satellite. This procedure will cause the successful time correlation between the locally generated code W, 334 in FIG. 5, and the signal from the GPS satellite to occur at random time intervals. The time correlation result, Z, 336 in FIG. 5, is reported back to the common processor 385 in container 340. This is the last of the five signals passing into or out of the container, 340. This signal is checked by said processor at all of the possible correlation result times to determine if a correlation match has or has not occurred. If a successful match occurs when it should not occur, or when it is inconsistent with the authorized IRD position, the processor registers an incorrect position. Thus the signal, Z, is dynamic in that successful correlations occur at random times. Also, times at which the processor expects no positive correlation are checked for the negative result. A positive correlation at a time when one is not expected is registered as an error.

Figure 6:
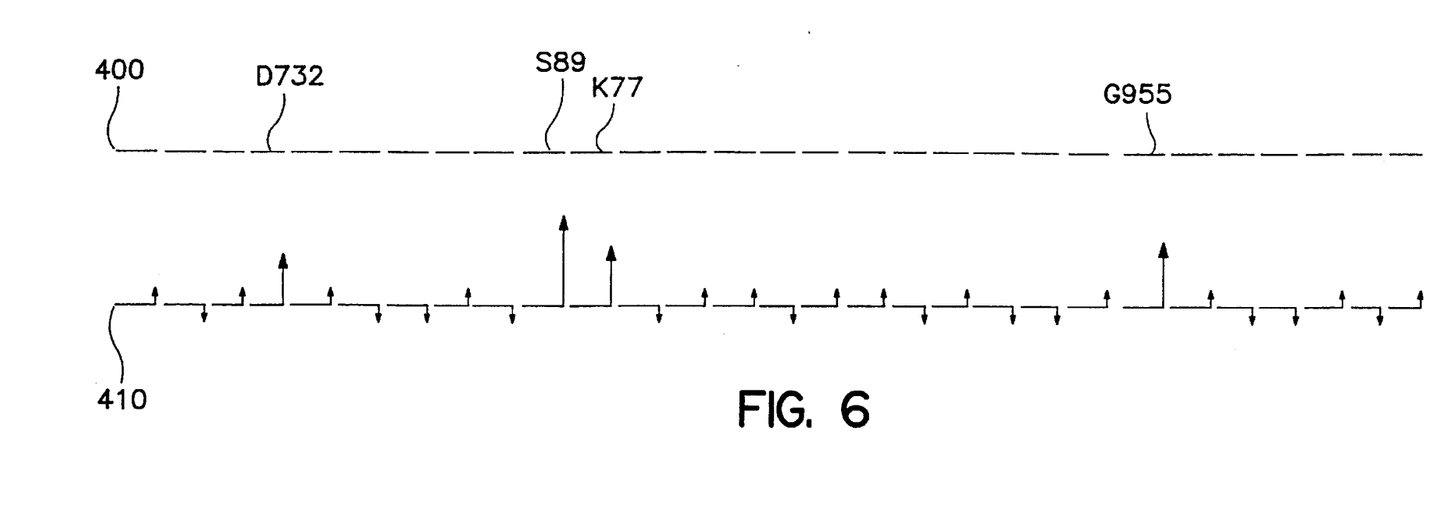
FIG. 6 shows a sequence of correlation results for different Gold codes generated in a portion of FIG. 5.

FIG. 6 shows a sequence of correlations wherein different Gold codes generated at W, 334 in FIG. 5, corresponding to actual different GPS satellites and to some fictitious satellites or satellites which are not currently visible on the same side of the earth are generated and the resulting correlations which are reported back via signal, Z, 336 in FIG. 5. The time line 400 in FIG. 6, represents time proceeding from left to right. The line is divided into a plurality of individual correlation periods. Four of these periods result in positive correlations and are labeled as D732, S89, K77 and G955 respectively. The letter in each designation corresponds to the particular GPS satellite. The number in each designation corresponds to the time delay used for the code of the GPS satellite. The other correlation periods in FIG. 6 do not result in positive correlations but include various time delays for the codes of other GPS satellites.

The time line 410 in FIG. 6 shows the results of the correlations performed along line 400 and show those resulting in positive correlations. These positive correlations corresponding to those periods along line 400 over which the satellite and time delay designations occur. Both the absence of a positive correlation and the presence of a positive correlation are checked and reported by signal Z, 336 in FIG. 5. Any person attempting to cause the authorized position to register with the processor 385 inside container 385 has to produce this randomly varying waveform.

In FIG. 5, a common processor 385 is shown, which carries out the tasks of storage of the authorized position in GPS coordinates and GPS processing, and known conditional access. The processor 385 works in conjunction with the GPS real time controller 383, to which the processor can provide instructions in terms of data words. The controller will implement the real time sequential operations according to states timed by the clock 338. Controller 383, processor 385, and code generator 388 could be implemented on the same integrated circuit chip for a minimum cost processor.

Although specific constructions have been presented herein, it is to be understood that these are for illustrative purposes only. Various modifications and adaptations will be apparent to those of skill in the art. In view of possible modifications, it will be appreciated that the scope of the present invention should be determined by reference to the claims appended hereto.

What is claimed is:

1. A video signal access control system comprising a customer access control operable at a customer location and having:

a signal input to receive at least one video signal from a remote source;

a video signal processor operably connected to receive video signals from the signal input;

a conditional accesser operably connected to the video signal processor;

a signal output operably connected to the video signal processor and providing a useable video output signal only upon the conditional accesser authorizing access to one or more video signals from the remote source; and a GPS signal receiver operable at the customer location to receive position information from remote sources and operably connected to the conditional accesser, the conditional accesser authorizing access only if the GPS signal receiver receives signals consistent with the customer access control being at an authorized location.

2. The video signal access control system of claim 1 wherein the conditional accesser authorizes access only if the GPS signal receiver receives signals consistent with the customer access control being at a single fixed location authorized for service.

3. The video signal access control system of claim 2 wherein conditional accesser authorizes access using criteria to test for authorization in addition to information about the location of the customer access control.

4. The video signal access control system of claim 3 wherein the customer access control is a non-transmitting unit.

5. The video signal access control system of claim 2 wherein customer access control uses the GPS receiver and conditional accesser to make range verifications consistent with the customer access control being at a single fixed location authorized for service and without the customer access control determining the location of the customer access control.

6. The video signal access control system of claim 2 wherein the customer access control uses the GPS receiver to determine the location of the customer access control and wherein the conditional accesser authorizes access only if the determined location is at the single fixed location authorized for service.

7. The video signal access control system of claim 1 wherein the customer access control is a non-transmitting unit.

8. The video signal access control system of claim 1 wherein customer access control uses the GPS receiver and conditional accesser to make range verifications consistent with the customer access control being at a single fixed location authorized for service and without the customer access control determining the location of the customer access control.

9. The video signal access control system of claim 8 wherein the GPS receiver of the customer access control is a single channel receiver.

10. The video signal access control system of claim 1 wherein the customer access control uses the GPS receiver to determine the location of the customer access control and wherein the conditional accesser authorizes access only if the determined location is at the single fixed location authorized for service.

11. The video signal access control system of claim 1 wherein the customer access control further includes a GPS processor operably connected to receive direct GPS information from the GPS receiver and a decoder operably connected to the signal input to provide indirect GPS signals received from a transmission medium carrying the at least one video signal from a remote source; and wherein the GPS processor uses information from the indirect GPS signals to determine which GPS sources are to be used by the customer access control and the location of the determined GPS sources.

12. The video signal access control system of claim 11 further comprising a central access control remote from customers and having:

a source of at least one video signal;

an output device for placing video signals from the source onto a transmission medium for transmission to customers with the customer access control;

a central GPS receiver operable to receive position information from remote sources and operably connected to apply data messages to the output device, the data messages corresponding to the position information and the output device supplying the position information to the transmission medium for transmission to customers.

13. The video signal access control system of claim 1 wherein the customer access control further includes a GPS processor operably connected to receive direct GPS information from the GPS receiver and wherein the conditional accesser requests measurements from the GPS processor at measurement start times which are at least pseudo-random.

14. The video signal access control system of claim 13 wherein the customer access control has the GPS processor and conditional accesser within a common sealed container selected from the group consisting of: an integrated circuit and a smart card; and wherein the common sealed contained has within it a code generator operable to generate a code for selecting a GPS source from which data is to be obtained.

15. The video signal access control system of claim 1 further comprising a central access control remote from customers and having:

a source of at least one video signal;

an output device for placing video signals from the source onto a transmission medium for transmission to customers, the video signals sent to customers being unusable without a key.

16. The video signal access control system of claim 15 wherein the central access control further includes:

a central GPS receiver operable to receive position information from remote sources and operably connected to apply data messages to the output device, the data messages corresponding to the position information and the output device supplying the position information to the transmission medium for transmission to customers.

17. A video signal access control system comprising a customer access control operable at a customer location and having:

a signal input to receive at least one video signal;

a video signal processor operably connected to receive video signals from the signal input;

a conditional accesser operably connected to the video signal processor;

a signal output operably connected to the video signal processor and providing a useable video output signal only upon the conditional accesser authorizing access to one or more video signals from the remote source; and a GPS signal receiver operable at the customer location to receive position information from remote sources and operably connected to the conditional accesser, the conditional accesser authorizing access only if the GPS signal receiver receives signals indicating that the customer access control is at an authorized location; and wherein the conditional accesser authorizes access only if the GPS signal receiver receives signals consistent with the customer access control being at a single fixed location authorized for service.

18. The video signal access control system of claim 17 wherein customer access control uses the GPS receiver and conditional accesser to make range verifications consistent with the customer access control being at a single fixed location authorized for service and without the customer access control determining the location of the customer access control.

19. The video signal access control system of claim 17 wherein the GPS receiver of the customer access control is a single channel receiver.

20. The video signal access control system of claim 17 wherein the customer access control uses the GPS receiver to determine the location of the customer access control and wherein the conditional accesser authorizes access only if the determined location is at the single fixed location authorized for service.

21. The video signal access control system of claim 17 wherein the customer access control further includes a GPS processor operably connected to receive direct GPS information from the GPS receiver and a decoder operably connected to the signal input to provide indirect GPS signals received from a transmission medium carrying the at least one video signal from a remote source; and wherein the GPS processor uses information from the indirect GPS signals to determine which GPS sources are to be used by the customer access control and the location of the determined GPS sources.

22. A video signal access control system comprising a customer access control operable at a customer location and having:

a signal input to receive at least one video signal;

a video signal processor operably connected to receive video signals from the signal input;

a conditional accesser operably connected to the video signal processor;

a signal output operably connected to the video signal processor and providing a useable video output signal only upon the conditional accesser authorizing access to one or more video signals from the remote source; and a GPS signal receiver operable at the customer location to receive position information from remote sources and operably connected to the conditional accesser, the conditional accesser authorizing access only if the GPS signal receiver receives signals indicating that the customer access control is at an authorized location; and wherein the conditional accesser uses criteria to test for authorization in addition to information about the location of the customer access control.

23. The video signal access control system of claim 22 wherein the conditional accesser authorizes access only if the GPS signal receiver receives signals consistent with the customer access control being at a single fixed location authorized for service.

24. The video signal access control system of claim 22 wherein the customer access control uses the GPS receiver and conditional accesser to make range verifications consistent with the customer access control being at a single fixed location authorized for service and without the customer access control determining the location of the customer access control.

25. The video signal access control system of claim 24 wherein the GPS receiver of the customer access control is a single channel receiver and wherein the customer access control is a non-transmitting unit.

26. The video signal access control system of claim 22 wherein the customer access control uses the GPS receiver to determine the location of the customer access control and wherein the conditional accesser authorizes access only if the determined location is at the single fixed location authorized for service.

27. The video signal access control system of claim 22 wherein the customer access control further includes a GPS processor operably connected to receive direct GPS information from the GPS receiver and a decoder operably connected to the signal input to provide indirect GPS signals received from a transmission medium carrying the at least one video signal from a remote source; and wherein the GPS processor uses information from the indirect GPS signals to determine which GPS sources are to be used by the customer access control and the location of the determined GPS sources.

28. The video signal access control system of claim 22 wherein the customer access control further includes a GPS processor operably connected to receive direct GPS information from the GPS receiver and wherein the conditional accesser requests measurements from the GPS processor at measurement start times which are at least pseudo-random and wherein the customer access control has the GPS processor and conditional accesser within a common sealed container selected from the group consisting of: an integrated circuit and a smart card; and wherein the common sealed contained has within it a code generator operable to generate a code for selecting a GPS source from which data is to be obtained.

29. A video signal access control system comprising a customer access control operable at a customer location and having:
a signal input to receive at least one video signal;
a video signal processor operably connected to receive video signals from the signal input;
a conditional accesser operably connected to the video signal processor;
a signal output operably connected to the video signal processor and providing a useable video output signal only upon the conditional accesser authorizing access to one or more video signals from the remote source; and
a GPS signal receiver operable at the customer location to receive position information from remote sources and operably connected to the conditional accesser, the conditional accesser authorizing access only if the GPS signal receiver receives signals indicating that the customer access control is at an authorized location; and wherein the customer access control is a non-transmitting unit.

30. The video signal access control system of claim 29 wherein the conditional accesser authorizes access only if the GPS signal receiver receives signals consistent with the customer access control being at a single fixed location authorized for service.

31. The video signal access control system of claim 29 wherein the customer access control uses the GPS receiver and conditional accesser to make range verifications consistent with the customer access control being at a single fixed location authorized for service and without the customer access control determining the location of the customer access control.

32. The video signal access control system of claim 29 wherein the GPS receiver of the customer access control is a single channel receiver.

33. The video signal access control system of claim 29 wherein the customer access control uses the GPS receiver to determine the location of the customer access control and wherein the conditional accesser authorizes access only if the determined location is at the single fixed location authorized for service.

34. The video signal access control system of claim 29 wherein the customer access control further includes a GPS processor operably connected to receive direct GPS information from the GPS receiver and a decoder operably connected to the signal input to provide indirect GPS signals received from a transmission medium carrying the at least one video signal from a remote source; and wherein the GPS processor uses information from the indirect GPS signals to determine which GPS sources are to be used by the customer access control and the location of the determined GPS sources.

35. The video signal access control system of claim 29 wherein the customer access control further includes a GPS processor operably connected to receive direct GPS information from the GPS receiver and wherein the conditional accesser requests measurements from the GPS processor at measurement start times which are at least pseudo-random and wherein the customer access control has the GPS processor and conditional accesser within a common sealed container selected from the group consisting of: an integrated circuit and a smart card; and wherein the common sealed contained has within it a code generator operable to generate a code for selecting a GPS source from which data is to be obtained.

36. A video signal access control system comprising a central access control remote from customers and having:
a source of at least one video signal;
an output device for placing video signals from the source onto a transmission medium for transmission to customers;
a central GPS receiver operable to directly receive position information from remote GPS sources, the remote sources being remote from both the central access control and the customers, and operably connected to apply data messages to the output device, the data messages corresponding to the position information and the output device supplying the position information to the transmission medium for transmission to customers.

37. The video signal access control system of claim 36 wherein the central access control further comprises a central conditional access operably connected to the GPS receiver/processor and the output device to provide a scrambling key to the output device for scrambling video signals prior to placement on the transmission medium.

38. The video signal access control system of claim 37 wherein the central conditional access encrypts the position information supplied to the output device.

39. The video signal access control system of claim 37 further comprising a customer access control having:
a signal input to receive at least one video signal from a remote source;
a video signal processor operably connected to receive video signals from the signal input;
a conditional accesser operably connected to the video signal processor;
a signal output operably connected to the video signal processor and providing a useable video output signal only upon the conditional accesser authorizing access to one or more video signals from the remote source; and a GPS signal receiver operable to receive position information from remote sources and operably connected to the conditional accesser, the conditional accesser authorizing access only if the GPS signal receiver receives signals consistent with the customer access control being at an authorized location.

* * * * *